United States Patent Office 3,645,972
Patented Feb. 29, 1972

3,645,972
NITRILOTRIACETIC ANHYDRIDE AS AN
EPOXY RESIN CURING AGENT
Jack L. Herz, Scarsdale, and Edward D. Weil, Hastings-on-Hudson, N.Y., assignors to Stauffer Chemical Company, New York, N.Y.
No Drawing. Filed Oct. 27, 1969, Ser. No. 869,876
Int. Cl. C08g 30/12
U.S. Cl. 260—47 CA                    7 Claims

ABSTRACT OF THE DISCLOSURE

Nitrilotriacetic anhydride is used to provide relatively low temperature curing (as compared with other anhydrides) of epoxy coatings or laminates. The cured epoxy resins thus obtained are characterized by good mechanical and electrical properties as well as dimensional stability and superior resistance to heat and chemicals. This unusual combination of properties make nitrilotriacetic anhydride an ideal candidate for such applications as curing epoxy resin formulations.

FIELD OF THE INVENTION

The present invention relates to a novel chemical compound, nitrilotriacetic anhydride which is useful as a curing agent for epoxy resins. The aforesaid novel chemical compound is an excellent, low cost curing agent for epoxy applications requiring good physical and chemical properties.

Nitrilotriacetic anhydride is obtained by reacting nitrilotriacetic acid with a suitable dehydrating agent in the presence of an amine or amide solvent by the procedure described in copending application Ser. No. 851,083, filed Aug. 18, 1969.

DETAILED DESCRIPTION OF THE INVENTION

Epoxy resins are used, inter alia, in laminating, to make reinforced articles such as printed circuit boards, pressure vessel shells, automotive parts; they are also used in potting (or encapsulating) electrical and electronic components. They are further used as sealants, curable adhesives, and protective coatings. In all of these operations, it is imperative that the resin/curing agent composition prior to curing, should be flowable, to permit it to impregnate, embed, encapsulate or cover the desired filler or surface. On the other hand, after this flow-requiring phase of the manufacturing process, the epoxy resin must be capable of reasonably rapid controllable curing at modest temperatures, to avoid the need for long delays, and thermal damage to the article being impregnated, potted or coated. It has been quite difficult in the epoxy art to find catalysts or curing agents which have these somewhat opposite requirements of long pot life and short cure time.

It has been found that these difficult requirements are met by the products of the invention that is, a composition comprising the heat reaction product of (1) a complex epoxide resin containing at least 1 oxirane group per molecule and comprising for example the reaction product of 2,2-bis-(4-hydroxyphenyl)-propane and epihalohydrin, said epoxide resin having an epoxide equivalent of about 180 to 200 and a viscosity between 10,000 and 19,000 cps. and (2) a curing agent for said epoxy resin that is, nitrilotriacetic anhydride, said curing agent being present in an amount ranging between about 1 and 40% by weight of the epoxide resin and suitably between about 5% and 25%.

The curing agent, nitrilotriacetic anhydride, is represented by the formula

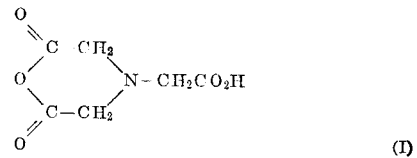

and this compound may be in admixture with dimeric nitrilotriacetic anhydride of the formula:

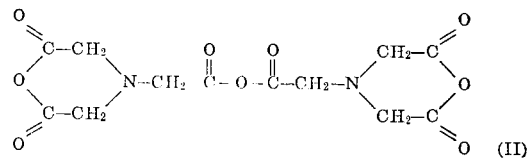

Accordingly, the term nitrilotriacetic anhydride as used in the specification and claims herein includes not only the compound represented by Formula I supra but also includes a mixture of compounds of Formulas I and II supra wherein a substantial portion of the mixture is made up of a compound of Formula I.

The epoxy resins cured by nitrilotriacetic anhydride are also characterized by good mechanical and electrical properties, dimensional stability, superior resistance to heat and chemicals and are useful for laminating and molding applications. The unique combination of properties such as good high temperature properties, ease of handling, adequate pot life and additionally, low cost, is not usually available from conventional curing agents. Nitrilotriacetic anhydride thus provides good overall properties to epoxy resins.

More specifically, unfilled resins produced from a liquid bisphenol A epoxy resin (possessing an epoxy equivalent between about 180 and 200) cured with nitrilotriacetic anhydride are characterized by good heat distortion temperature, flexural strength and high Barcol hardness. Nitrilotriacetic anhydride provides the good chemical resistance that is typical of an epoxy system cured with an acid anhydride. For example, when bisphenol A epoxy resin (100 parts) is cured with nitrilotriacetic anhydride (33 parts), the resulting cured product is characterized by excellent chemical resistance to such substances as acetone, xylene, sodium hydroxide and acetic acid even after continued exposure to such substances.

In addition, on comparison of the curing agent of the present invention with a conventional curing agent used with epoxy resins that is, pyromellitic acid dianhydride, it has been found that by use of the curing agent of the present invention, the actual hardening procedure is more easily controlled. Further, the curing agent of the present invention shows greater resistance to sublimation as compared with the aforementioned pyromellitic acid dianhydride. In addition, the curing agent of the present invention is characterized by a higher degree of solubility in a large number of epoxy compounds.

Nitrilotriacetic anhydride can be produced in a number of forms such as, for example, in flake or powdered form. The flake is more resistant to atmospheric hydrolysis but it also is generally more difficult to disperse. Flaked nitrilotriacetic anhydride can be ground with a solid epoxy compound and can also be milled into a liquid epoxy compound on a three roll paint mill. Powdered nitrilotriacetic anhydride may be dispersed directly into a previously ground solid epoxy or into a liquid. If the gel temperature is high enough, both the solid and liquid epoxy systems will become clear during gelation.

In its use as an epoxy curing agent, nitrilotriacetic anhydride can be used as the sole curing agent in the system or in conjunction with a tertiary amine co-curing agent (or activator). The supplemental use of a tertiary nitrogen base, i.e., a tertiary amine, or a mixture of such bases, is desirable in some respects as it accelerates the reaction and improves the yield. It has been found that the stronger the base, the more rapid the reaction. Particularly useful and suitable co-curing agents are pyridine and alkylated pyridines in which the 4- and 6-positions are not substituted at the same time; N-alkyl-morpholines such as N - methyl - morpholine, N - ethylmorpholine, and the like; trialkylamines such as triethylamine, tributylamine or trioctylamine, triethylene - diamine or 2,4,6 - tris - dimethylamino methylphenol. The tertiary amine co-curing agent is used in amounts varying between about 0.1% and 200% and suitably between about 10% and 90% by weight based on the weight of the curing agent.

Nitrilotriacetic anhydride is suitable for the hardening of epoxy resins which contain, for example, from 1 to 5 epoxy groups per molecule.

Typical epoxy resins which are usually used for casting, laminating and encapsulation are described, for example, on page 47 of "Epoxy Resin Technology," Bruins, (1968) and these resins are characterized by epoxy equivalent weights of 180–200 and viscosities from 10,000 to 19,000 cps. Illustrative epoxy resins are glycidyl ethers and illustratively, the (2,3 - epoxypropyl)penta - ether of 2,2,6,6 - tetramethylolcyclohexanol, epoxyalkyloxyphenylalkanes such as 2,2 - bis - [p - (2,3 - epoxy)-propyloxyphenyl] - propane ("Araldite F"-Chima 19, 360 (1965)), epoxyalkyl-epoxycycloalkanes such as 1-epoxyethyl - 3,4 - epoxycyclohexane or dialkene dioxides such as dipentene dioxide (limonene dioxide) and 3,4 - epoxy-6-ethylcyclohexyl-methyladipate.

The following examples are only illustrative of the present invention and therefore are not to be considered to be limitative in scope. The temperatures are given in centigrade degrees.

EXAMPLE 1

To 1.0 g. of Epon 828 (Shell Chemical Co.—an epoxy resin mentioned on page 47 of Bruins "Epoxy Resin Technology")-characterized by an epoxide equivalent of 185–192, a melting point of 90 C. and a hydroxyl content of 0.1–0.2 (that is, 0.1–0.2 hydroxy groups per molecule) is added 0.1 g. of crude nitrilotriacetic anhydride. After dissolving almost all the anhydride at room temperature, the mixture is placed in an oven and heated to a temperature of 100°–115° for 24 hours. No apparent change in viscosity is noted. Thereupon, the mixture is heated at 145°–150° for 24 hours and curing is effected. A hard clear dark amber coating is obtained.

The known pyromellitic acid dianhydride is insoluble in the epoxy resin used in this example and consequently, cannot be used with such a resin.

EXAMPLE 2

To 1.0 g. of Epon 828 is added 0.1 g. of nitrilotriacetic anhydride and 0.04 g. of N-methylmorpholine. After 1 hour at 120°, the resin is light amber and it is already firm (at 120°). After 8 hours at 120°, the resin is still light amber and quite hard. Upon standing overnight at 120°, no apparent change is noted. The cured resin had a Barcol hardness of 50.

EXAMPLE 3

As a control, the procedure of Example 2 is repeated except for the fact that, to 10 g. of Epon 828, there is only added 0.40 g. of N-methylmorpholine (nitrilotriacetic anhydride is therefore not used). After 8 hours at 120°, there is no apparent curing of the resin.

EXAMPLE 4

In a suitable glass flask, 10 g. of 2,2-bis[p-(2,3-epoxy)-propyloxyphenyl]-propane with an 8.2% content of epoxy groups ("Araldite F," Chimia 19, 360 (1965)), and 0.2 ml. of tributylamine are mechanically stirred at 100°. While maintaining the reaction temperature at 100°, 0.5 g. of mixed nitrilotriacetic anhydrides are added to the reaction mixture within a 15 minute period of time. Before the reaction mixture thickens, it is poured into a glass container and heated in an oven for three hours at 100°, for five hours at 130° and for four hours at 180°. A hard transparent product is obtained which melts at a temperature above 100°.

Pyromellitic acid dianhydride is insoluble in, 2,2-bis-[p-(2,3-epoxy)-propyloxyphenyl]-propane including a mixture of this epoxy compound with the tributylamine and consequently, the aforesaid dianhydride is unsuitable for use as a curing agent for the indicated epoxy compound.

EXAMPLE 5

10 g. of 2,2 - bis-[p-(2,3-epoxy)propyloxyphenyl]-propane and 0.2 ml. of N,N'-dimethylpiperazine are heated at 100°; 1.0 g. of nitrilotriacetic anhydride is added to the reaction mixture. The reaction product which is obtained is heated for 1 hour at 110°, then for three hours at 125° and finally for ten hours at 180°. A solid hard and transparent mass is obtained which melts at a temperature in excess of 100°.

EXAMPLE 6

Following the procedure described in Example 5 supra, except for the use of Araldite 6005, (an epoxy resin disclosed in U.S. Pat. 3,311,589 having an epoxide equivalent of 180–190 and a hydroxyl content of 0.1–0.2 hydroxy groups per molecule), there is obtained a hard solid and transparent mass characterized by a melting point above 100°.

EXAMPLE 7

10 g. of Epi-Rez 510 (an epoxy resin disclosed in U.S. Pat. 3,311,589 comprising the reaction product of 2,2-bis-(4-hydroxyphenyl)-propane and epihalohydrin, the resin having an epoxy content of 185–192 and a hydroxyl content of 0.1–0.2 hydroxy groups per molecule) and 0.3 ml. of tributylamine are heated at 120°; in 30 minutes, 0.9 g. of nitrilotriacetic anhydride are added to the reaction and the reaction mixture is then heated for six hours at 120°, then for four hours at 160° and finally for 9 hours at 210°. There is obtained a hard and transparent resin melting at a temperature above 100°.

EXAMPLE 8

8 g. of 1-epoxy-ethyl-3,4-epoxy-cyclohexane and 0.1 g. of trioctylamine are heated at 110°; in 15 minutes 1 g. of nitrilotriacetic anhydride is added. The mixture is then heated for 20 hours at 115–135°, for 9 hours at 150°, for 5 hours at 170° and then for 7 hours at 210°. There is obtained a flexible and transparent mass which melts at a temperature in excess of 100°.

The nitrilotriacetic anhydride curing agents are prepared by reacting nitrilotriacetic acid (NTA) with a suitable dehydrating agent in the presence of an amine or amide solvent. Suitable dehydrating agents are anhydrides of such acids as acetic acid, propionic acid, butyric acid and the like. Suitable solvents include amide solvents such as N-methylpyrrolidone, dimethylformamide, N,N-dimethylacetamide and the like and amine solvents such as trimethylamine, triethylamine, triphenylamine, pyridine and the like.

The process for preparing nitrilotriacetic anhydride is suitably conducted at temperatures up to about 130° C. and usually at temperatures ranging between about 30° C. and about 100° C.

Examples 8 and 9 describe the preparation of nitrilotriacetic anhydride useful as a curing agent in the practice of the present invention.

EXAMPLE 8

To 20 ml. N-methylpyrrolidone was added 30 ml. acetic anhydride and 5.00 g. NTA. The mixture was stirred at 50–70° C. for 24 hours. The solvent, acetic acid, and unreacted acetic anhydride were removed under vacuum. An additional 20 ml. of acetic anhydride was added to the residue and the volatiles were removed under vacuum. This procedure was again repeated. The residue was placed in a Soxhlet thimble and then extracted with benzene. A residue of NTA anhydrides, mainly the monomeric anhydride, was obtained in the benzene solvent characterized by a melting point of 132–133° C. (decomp.).

The mass spectrum of the anhydride had a major peak at $m/e=173$ corresponding to the monomeric anhydride.

An osmometric molecular weight (in dimethylformamide) was conducted on the material thus obtained. A value of 185 was obtained indicating the presence of some of the dimeric anhydride.

EXAMPLE 9

To 50 ml. of pyridine was added 10.0 g. of NTA. After stirring for 10 minutes at 50° C., 50 ml. of acetic anhydride was added and the mixture was heated at 100° C. for 10 min. The solvent was removed by warming under vacuum and an additional 30 ml. of acetic anhydride was added. The volatile materials were again removed by warming under vacuum. 10.0 g. of residual and impure NTA anhydride oil remained. The infrared spectrum of this material showed a split carbonyl absorption at $5.50\mu$ and $5.65\mu$. There were no other strong or medium absorptions evident in the carbonyl or carboxylate region of the infrared indicating that the NTA anhydride synthesized under these conditions was mainly the dimeric anhydride.

We claim:
1. A composition of matter comprising the heat reaction product of (1) a complex epoxide resin containing at least 1 oxirane group per molecule and (2) nitrilotriacetic anhydride, the aforesaid anhydride being present in an amount ranging between about 1 and about 40% by weight of the epoxide resin.

2. A composition according to claim 1 wherein the epoxide resin comprises the reaction product of 2,2-bis-(4-hydroxyphenyl)-propane and epihalohydrin.

3. A composition according to claim 1 wherein the epoxide resin has an epoxide equivalent of about 180–200 and a viscosity between 10,000 and 19,000 c.p.s.

4. A composition of matter according to claim 1 wherein the nitrilotriacetic anhydride is present in an amount ranging between 5% and 25% by weight.

5. A composition of matter according to claim 1 wherein a tertiary amine co-curing agent is present in an amount ranging between about 10% and 90% by weight based on the weight of the nitrilotriacetic anhydride.

6. A composition of matter according to claim 5 wherein the tertiary amine is N-methylmorpholine, tributylamine, trioctylamine or 2,4,6-tris-dimethylaminomethylphenol.

7. A composition of matter according to claim 6 wherein the tertiary amine is N-methylmorpholine.

References Cited

UNITED STATES PATENTS 3,140,299   7/1964   Loncrini _____ 260—47 EP X

WILLIAM H. SHORT, Primary Examiner

T. E. PERTILLA, Assistant Examiner

U.S. Cl. X.R.

117—161 ZB; 161—184; 260—2 EA, 78.4 EP

UNITED STATES PATENT OFFICE
CERTIFICATE OF CORRECTION

Patent No. 3,645,972                Dated  February 29, 1972

Inventor(s)  Jack L. Herz  and  Edward D. Weil

It is certified that error appears in the above-identified patent and that said Letters Patent are hereby corrected as shown below:

Column 3, line 39, the word "Chima" should read -- Chimia --.

line 53, the number "90 C." should read
--9° C. --.

line 58, the number "100°" should read
-- 110° --.

Signed and sealed this 6th day of February 1973.

(SEAL)
Attest:

EDWARD M. FLETCHER, JR.
Attesting Officer

ROBERT GOTTSCHALK
Commissioner of Patents

Disclaimer 3,645,972.—*Jack L. Herz*, Scarsdale, and *Edward D. Weil*, Hastings-on-Hudson, N.Y. NITRILOTRIACETIC ANHYDRIDE AS AN EPOXY RESIN CURING AGENT. Patent dated Feb. 29, 1972. Disclaimer filed Aug. 13, 1974, by the assignee, *Stauffer Chemical Company*.
Hereby enters this disclaimer to claims 1, 2 and 4 of said patent.
[*Official Gazette September 24, 1974.*]